United States Patent [19]

Brakl

[11] 4,000,454
[45] Dec. 28, 1976

[54] LINEARIZATION APPARATUS FOR A NON-LINEAR RESISTANCE TRANSDUCER IN A SELF-BALANCING BRIDGE CONNECTION

[75] Inventor: George Felix Brakl, Malmö, Sweden

[73] Assignee: Instrumentfirman Inor AB, Malmö, Sweden

[22] Filed: Apr. 29, 1975

[21] Appl. No.: 572,705

[30] Foreign Application Priority Data

Sept. 26, 1974 Sweden .......................... 7412114

[52] U.S. Cl. .................. 323/75 N; 73/362 AR; 323/40; 323/69; 323/75 H; 328/171; 328/175
[51] Int. Cl.² .......................................... G01K 7/24
[58] Field of Search ............ 323/75 E, 75 H, 75 N, 323/22 T, 40, 68, 69; 73/362 AR; 328/168, 171, 172, 173, 175

[56] References Cited

UNITED STATES PATENTS

| | | | |
|---|---|---|---|
| 3,503,261 | 3/1970 | Riester et al. | 323/75 N |
| 3,754,442 | 8/1973 | Arnett | 73/362 AR |
| 3,817,104 | 6/1974 | Sapir | 323/75 N |
| 3,898,554 | 8/1975 | Knudsen | 323/40 |
| 3,906,338 | 9/1975 | Grindheim | 323/22 T |

*Primary Examiner*—Gerald Goldberg
*Attorney, Agent, or Firm*—Wenderoth, Lind & Ponack

[57] ABSTRACT

A linearization apparatus for a non-linear resistance transducer in a self-balancing bridge connection, in which apparatus the non-linear characteristic of the resistance transducer is linearized by changing the voltage impressed on the bridge as the resistance of the transducer changes.

8 Claims, 3 Drawing Figures

LINEARIZATION APPARATUS FOR A NON-LINEAR RESISTANCE TRANSDUCER IN A SELF-BALANCING BRIDGE CONNECTION

BACKGROUND OF THE INVENTION

1. Field of the Invention

The present invention generally relates to linearization apparatuses for measured value-producing impedance means, and more particularly to a linearization apparatus for a first measured value-producing impedance means which is series-connected with a second impedance means over a voltage source, the apparatus having feedback means to compensate for a change in potential relative to a reference potential, which change in potential has been caused by the first impedance means at the junction thereof with the second impedance means.

2. Description of the Prior-Art

Various types of impedance transducers are available, and by way of example mention should here be made of the temperature-sensitive resistance transducer in connection with which the invention will be described hereinbelow.

Like most transducers, the temperature-sensitive resistance transducer, for example a resistor whose resistance is dependent upon temperature, has a characteristic which is non-linear, that is, changes in the temperature of the transducer do not give rise to changes in the resistance of the transducer, which are proportional to said temperature changes.

Transducers of this kind are often employed in some type of bridge connection, it being extremely desirable to obtain an output signal which is linearly related to the quantity, that is the temperature, to which the transducer is responsive.

It can be shown in a simple way that not even a transducer having a linear characteristic provides in conventional bridge connections an output signal which is linearly dependent upon the variable of measured values. The non-linearity inherent in the bridge connection is normally amplified by the non-linearity of the transducer characteristic.

The method most common at present of linearizing a dependent signal which varies non-linearly with an independent variable, aims at effecting, within predetermined intervals of the range of values of the signal, an approximation by means of suitable straight lines. This method is expensive and nevertheless gives rise to errors of approximation which increase with the size of the approximation intervals and the degree of curvature of the characteristic.

SUMMARY

The object of the present invention, therefore, primarily is to provide a simple and continuous linearization, which is realized in that the linearization apparatus comprises means for varying, in response to said change of potential relative to the reference potential, the voltage impressed on the first and second impedance means from the voltage source.

BRIEF DESCRIPTION OF THE DRAWINGS

The invention will be more fully described hereinbelow and with reference to the accompanying drawings in which FIG. 1 substantially in the form of a block diagram shows an embodiment of the linearization apparatus according to the present invention.

DESCRIPTION OF THE PREFERRED EMBODIMENT

Figure 1:
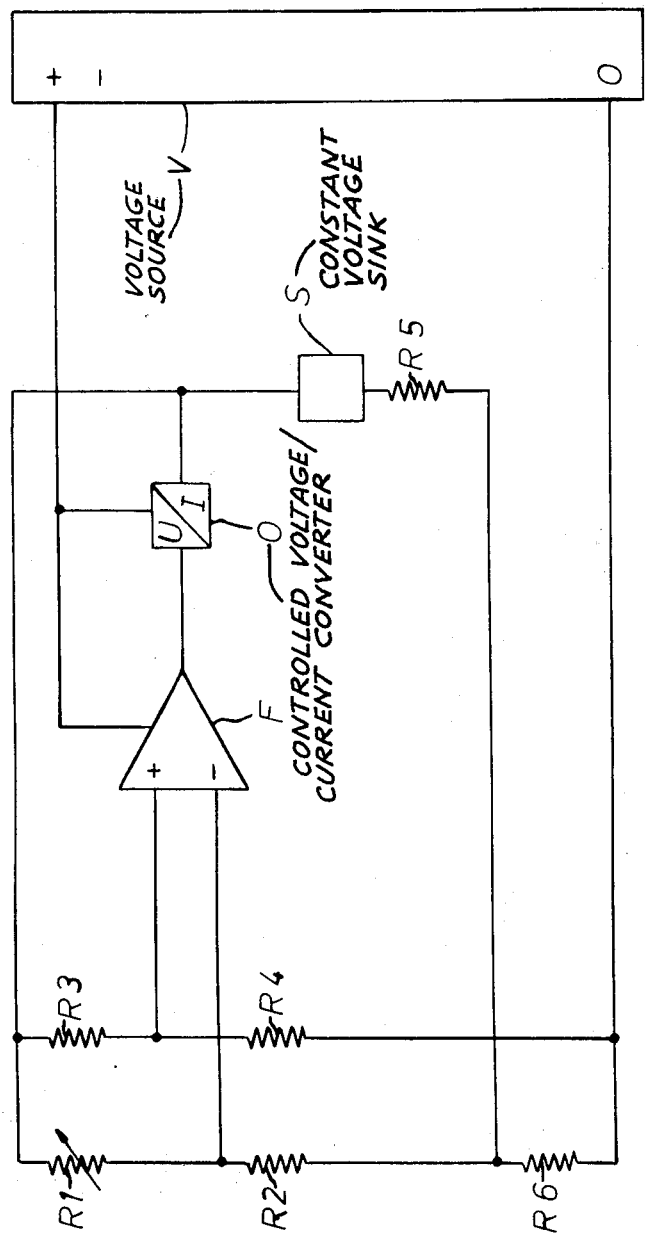

The linearization apparatus illustrated in FIG. 1 has a bridge circuit formed by four resistors R1–R4. Of these resistors R1–R4, the resistor R1 is assumed to be a resistor whose resistance is temperature responsive to an essentially higher degree than that of the resistors R2–R4 and which can thus be utilized as a temperature transducer.

The junction of the resistors R1 and R2 is connected to the inverting signal input of an operational amplifier F, while the junction of the resistors R3 and R4 is connected to the non-inverting signal input of operational amplifier F. Said amplifier F is supplied with feed voltage from one pole of a voltage source V, which is also connected to a controlled voltage/current converter O whose control input is connected to the output of said operational amplifier F. The output of the converter O is connected to the junction of the resistors R1 and R3 in the bridge circuit, that is one feeding point of the bridge circuit, and to a constant voltage sink S which in series with a resistor R5 is connected to a feedback resistor R6, which is connected into the bridge branch containing the resistor R2 and which has its other side connected to the resistor R4 and the other pole of the voltage source V.

The circuit described functions as follows (assuming that a temperature change occurs such that the resistance of the resistor R1 increases).

Because of the resistance increase of the resistor R1 the potential at the negative input of the operational amplifier F decreases, whereby the potential at the output of said operational amplifier F rises. Said rising output potential causes the voltage/current converter O to increase its output current which is fed through the constant voltage sink S and the resistor R5 via the resistor R6 to the other pole of the voltage source V. This will result in a voltage drop over the resistor R6, which counteracts and essentially compensates for the potential decrease at the inverting input of said operational amplifier F as a consequence of the temperature-responsive resistance increase of the resistor R1.

Since the bridge circuit R1–R4 lies substantially parallel with the circuit branch comprising the constant voltage sink S and the resistor R5, the voltage over the bridge circuit R1–R4 at the increase of the current emitted from the converter O will rise in a relation proportional to the current increase, as a result of the increased voltage drop over the resistor R5. The voltage thus increased over the bridge circuit R1–R4 requires a further increase of the current through the resistor R6 to balance the bridge circuit, whereby the current delivered by the voltage source V can be made linearly dependent upon the temperature change producing the change of resistance in the resistor R1.

By a suitable choice of components it is possible to attain an essentially complete and continuous linearization by means of the apparatus according to the invention, the changes in the current delivered by the voltage source V being directly proportional to the changes in the parameter acting upon the transducer. The voltage over the bridge circuit R1–R4 will be changed in response to the current delivered by the voltage source V, said current thus being the directly measured quantity.

As a simplified description of the circuit in FIG. 1 the following equations can be established:

$$V^- = \frac{R2 + R6}{R1 + R2 + R6} [U + (R5 + R6)J] + R6 \cdot J \quad (1)$$

$$V^+ = \frac{R4}{R3 + R4} [U + (R5 + R6)J] \quad (2)$$

wherein $V^-$ is the potential at the inverting input of the amplifier F, $V^+$ is the potential at the non-inverting input of the amplifier F, U is the voltage over the constant voltage sink S, J is the current withdrawn via the converter O from the voltage source V, while the other denominations will appear from FIG. 1.

The balance condition:

$$J = AB (V^+ - V^-) \quad (3)$$

applies to said circuit, A being the raw amplification of the operational amplifier F, and B the amplification of the converter O. The incorporation of equations (1) and (2) in equation (3) gives:

$$J = \frac{\left(\frac{R4}{R3 + R4} - \frac{R2 + R6}{R1 + R2 + R6}\right) \cdot U}{R6 - 1/AB - (R5 + R6) \left(\frac{R4}{R3 + R4} - \frac{R2 + R6}{R1 + R2 + R6}\right)}$$

in which the term 1/AB is negligible.

Figure 2:
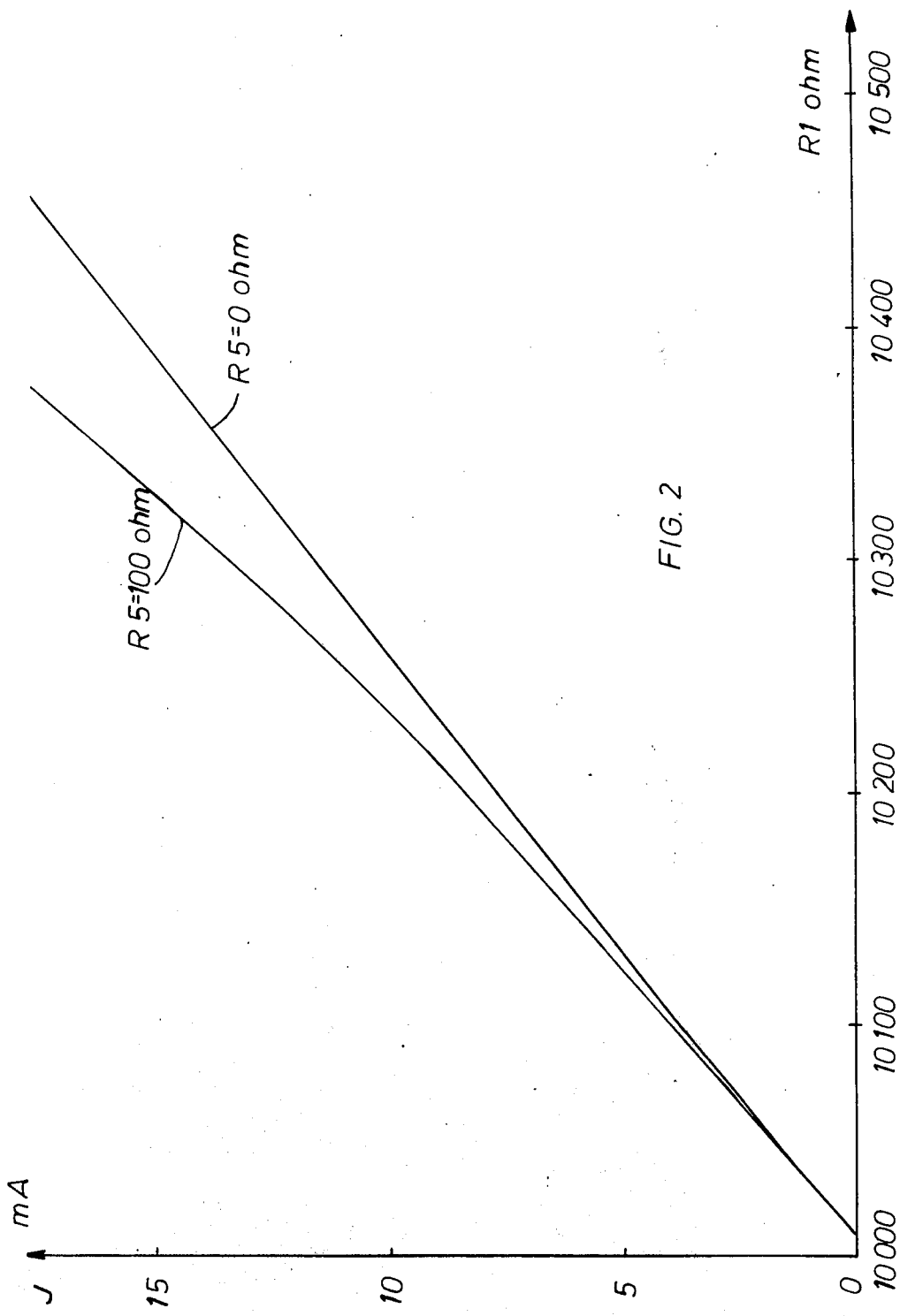
FIG. 2 is an explanatory diagram.

The diagram in FIG. 2 shows J as a function of R1 and R5 as a parameter. The following values have been assumed for the other quantities:
R2 = R3 = R4 = 10,000 ohm
R6 = 5 ohm
U = 8 V As will appear from FIG. 2, the provision of the resistor R5 will result in the curve for J being elevated as the resistance of R1 increases. This permits a very good linearization of J as a function of for example the temperature influencing the resistance of the resistor R1, provided that the last-mentioned resistance as a function of the temperature has a monotonously decreasing derivative. A linearization is, however, possible also when the derivative increases monotonously.

A condition sufficient for said linearization thus is that the characteristic of the transducer within the measuring range has a monotonous derivative. If this condition is not satisfied said linearization can, however, still be realized by a suitable exchange or rearrangement of the apparatus components outside the bridge circuit for each portion of the measuring range, that satisfies the above condition.

Being conventional, the operational amplifier F shown in block form in the drawing therefore requires no further explanation. The voltage/current converter O illustrated is also a conventional circuit and can comprise, for example a pair of Darlington-connected transistors. The constant voltage sink S is for example a Zener diode which is connected in a per se known manner in a circuit by means of which the characteristic of the diode is made ideal.

Figure 3:
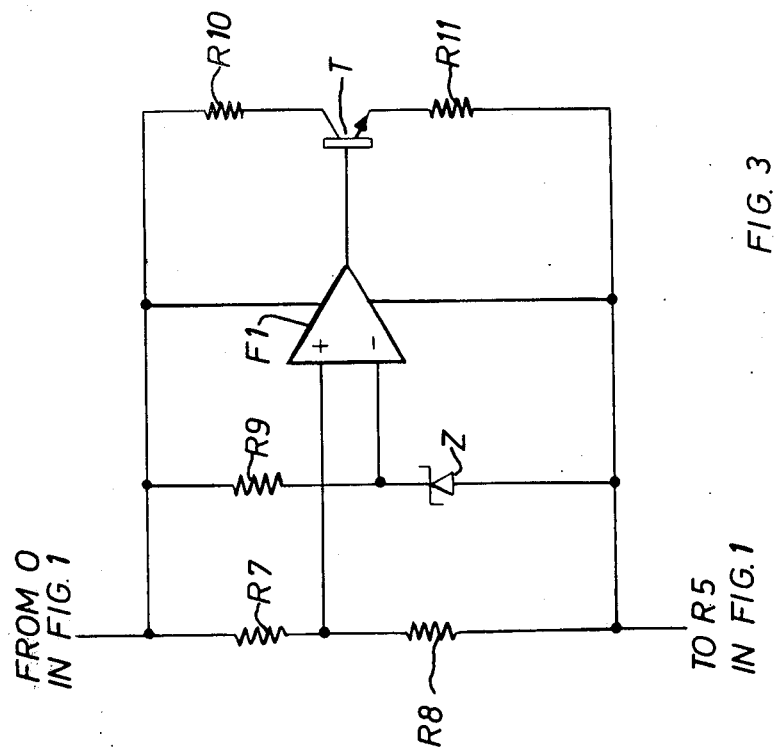
FIG. 3 is a circuit diagram for an embodiment of the constant voltage sink in the linearization apparatus according to the invention.

However, an embodiment of the constant voltage sink S is shown in FIG. 3. Said sink includes a voltage divider inserted between the voltage/current converter O and the resistor R5 and consisting of two resistors R7 and R8. A resistor R9 in series with a Zener diode Z is connected in parallel with the voltage divider R7, R8. Further, the supply terminals of an operational amplifier F1 are connected over the voltage divider R7, R8. Finally, a series circuit comprising a resistor R10, an NPN-transistor T and a resistor R11 is also connected in parallel with the voltage divider R7, R8. The junction of the resistors R7, R8 is connected to the non-inverting input of said operational amplifier F1, while the junction of the resistor R9 and the Zener diode Z is connected to the inverting input of said operational amplifier F1. The output of said operational amplifier F1 is connected to the base of the transistor T.

Said operational amplifier F1 controls the transistor T in such a way that the voltage between the inputs of the operational amplifier is zero.

If, for example, the current from the voltage/current converter O increases, the potential at the junction of the resistors R7 and R8 will increase. As a result, the potential at the output of the operational amplifier F1 increases, as does the current through the transistor T. This will reduce the current through the voltage divider R7, R8 so that the potential at the non-inverting input of the operational amplifiier F1 decreases. The current through the voltage divider is thus controlled in such a manner that the potential at the junction of the resistors R7, R8 will be equal to the potential at the junction of the resistors R9 and the Zener diode Z.

The voltage $U_S$ over the constant voltage sink S will thus be:

$$U_S = \frac{r_7 + r_8}{r_8} \cdot U_z$$

wherein $r_7$ and $r_8$ are the resistance values of the resistors R7 and R8, and $U_z$ is the Zener voltage of the Zener diode.

The current through the Zener diode can be set by means of the resistors R9, and the operating range of the transistor T can be set by means of the resistors R10 and R11.

The above embodiment of the invention was described for purposes of illustration rather than limitation. All possible variations and modifications of said embodiment are understood as being included within the scope of the appended claims.

What I claim and desire to secure by Letters Patent is:

1. In a linearization apparatus for a first measured value producing impedance means connected in series with a second impedance means over a voltage source having a plurality of poles and having a feedback means for compensating for a change in potential relative to a reference potential, said change in potential caused by the junction of said first impedance means with said second impedance means, the improvement comprising:
   voltage varying means between said voltage source and said first and second impedance means for varying the voltage impressed on said first and second impedance means from said voltage source in response to said change in potential relative to said reference potential.

2. An improvement as claimed in claim 1 wherein said voltage varying means is comprised of:
  a constant voltage sink fed from said voltage source in response to said change in potential; and
  a resistor connected in series with said constant voltage sink over said first and second impedance means.

3. An improvement as claimed in claim 2 wherein said voltage varying means is further comprised of:
  a voltage/current converter connected between one pole of said voltage source and said constant voltage sink, said converter responsive to said change in potential.

4. An improvement as claimed in claim 3, further comprising:
  a resistor connected between the second pole of said voltage source and said second impedance means.

5. An improvemet as claimed in claim 3 further comprising:
  third and fourth impedance means connected in series between the connection of said voltage/current converter to said constant voltage sink and the second pole of said voltage source for generating a reference potential.

6. An improvement as claimed in claim 5, further comprising:
  an operational amplifier connected at one input thereof to the junction of said first and second impedance means and at another input thereinto to the junction of said third and fourth impedance means, and connected at the output thereof to the control input of said voltage/current converter.

7. An improvement as claimed in claim 5 further comprising:
  a resistor connected between the second pole of said voltage source and said second impedance means.

8. An improvement as claimed in claim 5 further comprising:
  an operationl amplifier connected at one input thereof to the junction of said first and second impedance means and at another input thereinto to the junction of said third and fourth impedance means, and connected at the output thereof to the control input of said voltage/current converter.

* * * * *